US007538759B2

(12) United States Patent
Newton

(10) Patent No.: US 7,538,759 B2
(45) Date of Patent: May 26, 2009

(54) TOUCH PANEL DISPLAY SYSTEM WITH ILLUMINATION AND DETECTION PROVIDED FROM A SINGLE EDGE

(75) Inventor: John Newton, Auckland (NZ)

(73) Assignee: Next Holdings Limited, Auckland (NL)

( * ) Notice: Subject to any disclaimer, the term of this patent is extended or adjusted under 35 U.S.C. 154(b) by 478 days.

(21) Appl. No.: 10/840,888

(22) Filed: May 7, 2004

(65) Prior Publication Data
US 2005/0248540 A1   Nov. 10, 2005

(51) Int. Cl.
*G06F 3/041* (2006.01)
(52) U.S. Cl. .......................... 345/173; 345/175; 349/64
(58) Field of Classification Search ......... 345/173–179; 349/64–67
See application file for complete search history.

(56) References Cited

U.S. PATENT DOCUMENTS

| 4,553,842 | A | | 11/1985 | Griffin | |
|---|---|---|---|---|---|
| 4,710,760 | A | * | 12/1987 | Kasday | 345/175 |
| 4,868,551 | A | | 9/1989 | Arditty et al. | 340/712 |
| 4,990,901 | A | | 2/1991 | Beiswenger | |
| 5,525,764 | A | * | 6/1996 | Junkins et al. | 178/18.01 |
| 6,061,177 | A | | 5/2000 | Fujimoto | |
| 6,335,724 | B1 | | 1/2002 | Takekawa et al. | |
| 6,532,006 | B1 | | 3/2003 | Takekawa et al. | 345/173 |
| 6,927,384 | B2 | | 8/2005 | Reime et al. | 250/221 |
| 7,237,937 | B2 | * | 7/2007 | Kawashima et al. | 362/602 |
| 2001/0050677 | A1 | * | 12/2001 | Tosaya | 345/179 |
| 2001/0055006 | A1 | * | 12/2001 | Sano et al. | 345/175 |
| 2002/0008692 | A1 | * | 1/2002 | Omura et al. | 345/173 |
| 2002/0041327 | A1 | | 4/2002 | Hildreth et al. | |
| 2002/0064382 | A1 | | 5/2002 | Hildreth et al. | |
| 2003/0001825 | A1 | * | 1/2003 | Omura et al. | 345/173 |
| 2003/0043116 | A1 | | 3/2003 | Morrison et al. | |
| 2005/0128190 | A1 | * | 6/2005 | Ryynanen | 345/173 |
| 2005/0243070 | A1 | * | 11/2005 | Ung et al. | 345/176 |

FOREIGN PATENT DOCUMENTS

| CA | 2350152 | 6/2001 |
|---|---|---|
| JP | 11-212692 | 8/1999 |
| WO | WO 02/03316 | 1/2002 |

OTHER PUBLICATIONS

International Search Report, PCT/NZ05/00092, Sep. 27, 2006, pp. 1-3.

\* cited by examiner

*Primary Examiner*—Richard Hjerpe
*Assistant Examiner*—Kimnhung Nguyen
(74) *Attorney, Agent, or Firm*—Kilpatrick Stockton LLP

(57) ABSTRACT

A touch panel that has a front surface, a rear surface, a plurality of edges and an interior volume. An energy source is positioned in proximity to a first edge of the touch panel and is configured to emit energy that is propagated within the interior volume of the touch panel. A diffusing reflector is positioned in proximity to the front surface of the touch panel for diffusively reflecting at least a portion of the energy that escapes from the interior volume. At least one detector is positioned in proximity to the first edge of the touch panel and is configured to detect intensity levels of the energy that is diffusively reflected across the front surface of the touch panel. Preferably, two detectors are spaced apart from each other in proximity to the first edge of the touch panel, to allow calculation of touch locations using simple triangulation techniques.

39 Claims, 4 Drawing Sheets

TOUCH PANEL DISPLAY SYSTEM WITH ILLUMINATION AND DETECTION PROVIDED FROM A SINGLE EDGE

TECHNICAL FIELD

The present invention relates generally to a touch panel display system that allows a user to interact with displayed information by touching on or near a surface of the system. More particularly, the present invention relates to a touch panel display system that includes an energy source and a detector positioned on a single side of the touch panel, whereby a surface of the touch panel is illuminated by the energy source and an interruption of the illumination by a touch on or near the surface of the touch panel is detected by the detector.

BACKGROUND OF INVENTION

Touch panel display systems (also commonly known, for example, as touch screens systems) can allow a user to touch on or near an area of a touch panel (also commonly referred to as a touch screen) to enter a command to a computer system and, thereby, control the operation of the computer system. Touch panel display systems can provide an intuitive method by which people can easily interact with and control various functions performed by a computer system. For example, a touch panel display system can display icon elements representing a keyboard to allow a user to input text to a computer system. Such interactive graphical representations of a keyboard or other information can eliminate the need to configure a computer system with certain other input devices, such as a keyboard or mouse.

Touch panels can be produced in a variety of types and sizes and can be used as part of a wide variety of systems, such as kiosks, personal computer systems, portable consumer electronics (e.g., cellular telephones, personal digital assistants, hand held computers, video game devices, etc.), domestic appliances, vehicles information systems (e.g., GPS locators), and industrial equipment and tools. Businesses can use touch panel display systems to display information to potential customers and to receive feedback or commands from customers regarding information they desire. Touch panel display systems can also be used to facilitate business and/or consumer transactions, such as banking or the sale of merchandise or services. Earlier prior art approaches to touch panel display systems typically operated based on principles such as capacitance, resistance, or acoustic waves. More recent prior art approaches to touch panel display systems operate based on detection of emitted energy (e.g., infrared energy) and image processing, which can often be more accurate and reliable than the earlier prior art approaches.

One recent approach to touch panel display systems involves the detection of light emitted across a touch panel surface from an oscillating or rotating emission system, such as a fixed emitter and an oscillating or rotating reflector. A similar approach involves the detection of light emitted across a touch panel surface by an oscillating or rotating detector assembly. In either of these approaches, a user's touch is detected based on the interruption of the light emitted across the touch panel surface. However, these approaches rely on moving components, which are susceptible to mechanical failure, can decrease the detection accuracy of a user's touch, and lead to increased production costs and times.

Another recent approach to touch panel display systems involves the use of video cameras positioned behind the touch panel to detect light internally reflected within the touch panel. A touch, resulting from a user placing a finger or rubbery object directly on the touch panel surface, interrupts the internal reflection of light in the touch panel and causes a bright or dark image to appear on the touch panel, which is detected by the video camera. A user's touch of the touch panel will typically not be detected by this approach if it is made with less than firm contact by a finger or by an object of less than sufficient density. Furthermore, this approach involves video imaging, which usually requires expensive imaging components and complicated processing operations to detect the location of a touch on the touch panel. Additionally, the need to position the video camera behind the touch panel can make the display system bulky and limit its application.

Yet another recent approach to touch panel display systems involves the use of video cameras to acquire real-time images of the user touching on or near the touch panel surface. Such images are then processed to determine the location of the user's touch in relation to the touch panel. Touch panel display systems based on this approach usually also require expensive video imaging components and complicated processing operations to detect a touch location. Furthermore, the accuracy of these video-based systems can be sensitive to variations in the surrounding light levels (e.g., ambient light levels), which can further complicate the processing required to detect a touch. Moreover, this approach typically requires video cameras to be positioned on multiple sides of a touch panel display system in order to provide accurate touch detection, which usually also increases the production cost.

Accordingly, there remains a need in the art for a touch panel display system that can accurately detect a user's touch on or near a touch panel surface, but is less expensive and time consuming to produce as compared to existing approaches. There is also a need in the art for a touch panel display system that can be implemented with less expensive components and less complicated processing operations to detect touch location. There furthermore is a need in the art for a touch panel display system that can detect a touch without the need to position energy emission and/or detection components on multiple sides of a touch panel, thereby reducing the size of the system. Moreover, there is a need in the art for a touch panel display systems that has reduced sensitivity to variations in surrounding light levels, thereby further simplifying the processing operations to detect a touch.

SUMMARY OF INVENTION

The present invention, in accordance with exemplary embodiments described herein, provides a touch panel display system with illumination and detection functionality provided from a single edge of the touch panel. This touch panel display system can accurately detect a user's touch (e.g., with a finger, stylus, or other object) on or near the touch panel, but is less expensive and less time consuming to produce as compared to existing designs. The touch panel display system can also be implemented with less expensive components and can use simple processing operations to determine a touch location. Furthermore, the touch panel display system is not particularly sensitive to variations in surrounding light levels and other ambient conditions, which can also simplify the processing operations to detect a touch.

In accordance with certain aspects of the present invention, the touch panel display system includes a touch panel that is positioned in front of a display screen so that objects on the display screen can be seen through the touch panel. Alternatively, the touch screen may double as a display screen. The touch panel has a front surface, a rear surface, a plurality of edges and an interior volume. The touch panel may be constructed from any suitable transparent material, such as glass, plastic and/or thermoplastic.

The touch panel display system also includes an energy source positioned in proximity to a first edge of the touch panel and configured to emit energy that is propagated within the interior volume of the touch panel. One or more reflectors may be positioned and configured to guide the energy emitted by the energy source into the interior volume of the touch panel. The energy emitted by the energy source may be non-visible light energy, visible light energy, microwave energy, acoustic energy, etc. The energy source may include a plurality of energy emitters, such as light emitting diodes or the like, positioned at spaced intervals in proximity to the first edge of the touch panel. A reflective component may optionally be applied to at least one edge of the touch panel for controlling the direction of the energy propagated within the interior volume of the touch panel.

At least a portion of the energy propagated through the interior volume of the touch panel will necessarily escape toward the front surface of the touch panel. One or more reflectors may also be configured and positioned to guide the energy outward from within the interior volume of the touch panel toward the front surface of the touch panel. A diffusing reflector is positioned in proximity to the front surface of the touch panel for diffusively reflecting across the front surface at least a portion of the energy that escapes from the interior volume of the touch panel. A touch on or near the front surface of the touch panel results in a variation in the intensity levels of the energy that is diffusively reflected across the front surface.

At least one detector is positioned in proximity to the first edge of the touch panel and is configured to detect intensity levels of the energy that is diffusively reflected across the front surface of the touch panel. Preferably, two detectors are included and are spaced apart from each other in proximity to the first edge of the touch panel. The use of two or more detectors allows touch locations to be determined through simple triangulation calculations. The detectors may be, for example, optical imaging devices of sufficient sensitivity to detect variations in the intensity levels of the energy that is diffusively reflected across the front surface of the touch panel. One or more reflector may be positioned and configured to guide the energy reflected across the front surface of the touch panel toward the detectors.

These and other aspects of the invention will be described further in the detailed description below in connection with the appended drawings and claims.

DETAILED DESCRIPTION OF EXEMPLARY EMBODIMENTS OF THE INVENTION

Figure 1:
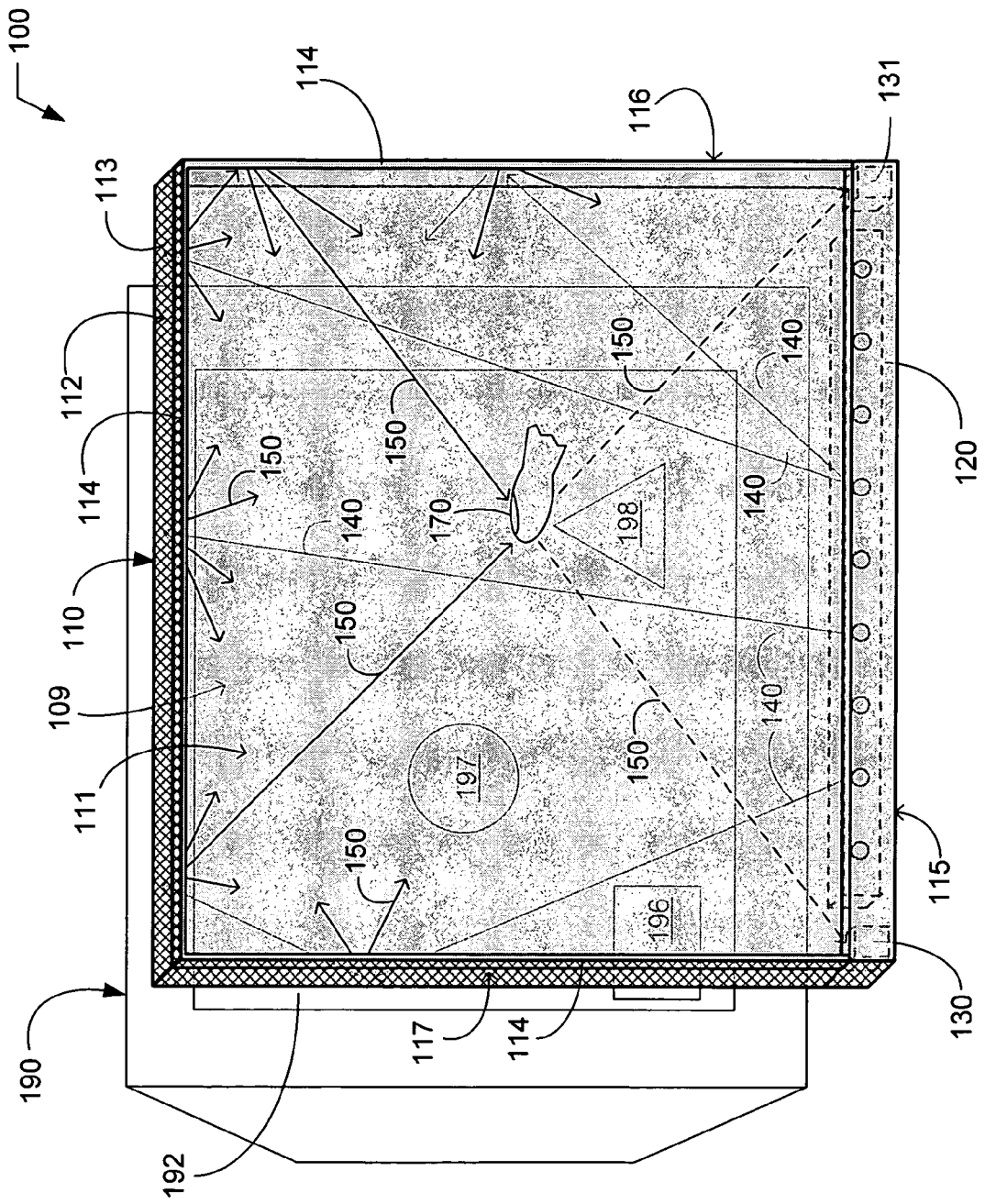
FIG. 1 is an exemplary perspective view of a touch panel display system in accordance with exemplary embodiments of the present invention.

Exemplary embodiments of the present invention will hereinafter be described with reference to the drawings, in which like reference numerals represent like elements throughout the several figures. FIG. 1 is an exemplary perspective view of a touch panel display system 100 in accordance with an exemplary embodiment of the present invention. As used herein, the term "touch panel display system" is meant to refer to a touch panel 110 and the hardware and/or software components that provide touch detection functionality. A touch panel display system 100 is also commonly referred to as a touch screen system.

The exemplary touch panel display system 100 is shown adjacent to an exemplary display device (i.e., video monitor) 190. The display device 190 may be interfaced to a personal computer (not shown), which may execute software for detecting touches on or near the touch panel 110. The illustration in FIG. 1 of the touch panel display system 100 adjacent to the display device 190 represents an exemplary application of the touch panel display system 100. For example, the touch panel display system 100 may be positioned and/or secured in front of the display device 190, so that a user can view and interact with the visual output (e.g., 196, 197, 198) of the display device 190 through the touch panel 110.

Thus, the touch panel display system 100 may have overlay or retrofit applications for existing display devices 190. However, it should be understood that other applications of the exemplary touch panel display system 100 are contemplated by the present invention. For example, the touch panel display system 100 may be applied as an integrated component of a display device 190 and may, in that regard, also function as a display screen for the display device 190. The exemplary touch panel display system 100 may be used in conjunction with display screens 190 of all sizes and dimensions, including but not limited to the display screens of small handheld devices, such as mobile phones, personal digital assistants (PDA), pagers, etc.

The touch panel 110 may also be referred to as a "touch screen" or a "touch display." At least a portion of the touch panel 110 is typically transparent and/or translucent, so that images (e.g., 196, 197, 198) or other objects can be viewed through the touch panel 110 and light and/or other forms of energy can be transmitted within or through the touch panel 110 (e.g., by reflection or refraction). For example, the touch panel 110 may be constructed of a plastic or thermoplastic material (e.g., acrylic, Plexiglass, polycarbonate, etc) and/or a glass type of material. In certain embodiments, the touch panel may be polycarbonate or a glass material bonded to an acrylic material. The touch panel 110 may also be constructed of other materials, as will be apparent to those skilled in the art. The touch panel 110 may also be configured with a durable (e.g., scratch and/or shatter resistant) coating.

The touch panel 110 has a front surface 111 and a rear surface 109, each defined by the height and width of the touch panel 110. The front surface 111 may also be referred to herein as the "touch surface." The touch panel 110 also has a depth, which defines a top edge 112, bottom edge 115, right side edge 116, left side edge 117, and interior volume of the touch panel 110. The interior volume of the touch panel 110 may comprise a solid volume of material(s), material(s) of varied density, or a void (possibly filled with liquid, gas plasma, etc). It is noted that although the exemplary touch panel 110 is described as having a rectangular shape, various other configurations are possible and will be apparent to those skilled in the art. The touch panel 110 may or may not include a frame, i.e., a casing or housing that surrounds the perimeter of the touch panel 110. In the exemplary embodiment shown in FIG. 1, the touch panel 110 does not include a frame.

The touch panel display system 100 includes an energy source 120 that is configured to emit energy, for example, in the form of pulses, waves, beams, etc. (generally referred to herein as "energy beams" for simplicity). The energy source 120 is typically positioned within or adjacent (e.g., in proximity) to a single edge of the touch panel 110. For example, as illustrated in FIG. 1, the energy source 120 may be positioned within or along the bottom edge 115 of the touch panel 110. However, it should be understood that the energy source 120 (as well as other components discussed herein, such as the detectors 130, 131) can be positioned within or along any other single edge of the touch panel 110 (e.g., the top edge 112, right edge 116, or left edge 117) in accordance with other embodiments of the invention.

The energy source 120 may emit one or more of various types of energy. For example, the energy source 120 may emit infrared (IR) energy. Alternately, the energy source 120 may emit visible and/or non-visible light energy (e.g., at one or more frequencies or spectrums), microwave energy, acoustic energy, or other types of energy that will be apparent to those skilled in the art. The energy source 120 may include one or more separate emission sources (emitters, generators, etc.) For example, the energy source 120 may include one or more infrared light emitting diodes (LEDs). As another example, the energy source 120 may include one or more microwave energy transmitters or one or more acoustic wave generators.

As is further illustrated in FIG. 1, the energy source 120 is positioned and configured such that it emits energy beams 140 into the interior volume of the touch panel 110. Reflectors or prisms may be used, as or if required, in order to guide the emitted energy beams 140 into the interior volume of the touch panel 110. As known in the art, if the energy beams 140 are emitted into the interior volume of the touch panel 110 at angles of incidence greater than a critical angle, they will be totally reflected within the interior volume of the touch panel 110. Those skilled in the art will appreciate that energy beams 140 may also be directly propagated through and/or refracted within the interior volume of the touch panel 110. Therefore, references herein to the "internal reflection" of energy beams 140 are used for convenience and are not intended to limit the scope of the present invention.

A reflective component 113 may be added to one or more edge (112, 115, 116, 117) of the touch panel 110, so as to aide or enhance the internal reflection of energy beams 140 and thereby control the direction of the energy beams 140. The one or more reflective component 113 may be an integral part of the touch panel 110. For example, a reflective component 113 may be created by varying the density, polarization, translucence or some other property of an edge (112, 115, 116, 117) of the touch panel 110. Alternatively, a reflective component 113 may be a separate material, such as reflective tape, paint, metal, plastic, etc., attached or mounted to an edge (112, 115, 116, 117) of the touch panel 110.

The configuration of and choice of material for a reflective component 113 may depend on the type of energy beams 140 employed in the touch panel display system 100. For example, if the energy beams 140 used in the touch panel display system 100 are visible or non-visible light energy (e.g., infrared energy), the reflective component 113 may have a metallic or mirror-like coating capable of reflecting such energy. Other types of materials may be used for reflecting other types of energy, as will be apparent to those skilled in the art. It should be understood that the use of a reflective component 113 is entirely optional in certain embodiments.

Some portion of the energy beams 140 that are internally reflected within the interior volume of the touch panel 110 will eventually escape via the front surface 111, the rear surface 109 and any edge 112, 115, 116, 117 of the touch panel 110 that is not covered by a reflective component 113. The energy beams 140 may be reflected out of the touch panel 110 as a result of refraction (e.g., when their angle of incidence is less than a critical angle) and optical coupling. The energy beams 140 may also be directed out of the interior of the touch panel 110 by variations in the reflective component 113. Energy beams 140 that escape via the front surface 111 and/or any edge (designated as energy beams 150 in FIG. 1) may be reflected across the front surface 111 of the touch panel 110 by one or more diffusing reflector 114. Diffusing reflectors may be positioned on or adjacent (e.g., in proximity) to one or more edges 112, 115, 116, 117 of the touch panel 110. For example, in the case of the rectangular touch panel 110 illustrated in FIG. 1, a diffusing reflector 114 extends forward from the top edge 112, the right edge 116 and the left edge 117 of the touch panel 110 forward of the front surface 111.

The diffusing reflector 114 may be an integral part of the touch panel 110 or may comprise separate material(s) mounted or connected (e.g., bonded or otherwise attached) to the perimeter of the front surface 111 and/or one or more of the edges 112, 116, 117 of the touch panel 110. As will be discussed further below, the diffusing reflector 114 typical has a reflective quality that causes energy beams 150 to reflect off of it in various directions, for example, along the front surface 111 of the touch panel 110. The reflective quality of the diffusing reflector 114 can be obtained, for example, by covering and/or coating one or more surfaces of the diffusing reflector 114 with a white colored paint or other substance that can provide the desired reflective property. Furthermore, one or more surfaces of the diffusing reflector 114 may have different textures, shapes, etc. (e.g., smooth, rough, uniform, non-uniform, etc.) to provide the desired reflective quality of the diffusing reflector 114.

In some embodiments, the diffusing reflector 114 may possess its reflective property as a result of the material(s) of which it is constructed. Additionally, the diffusing reflector may be formed as a single and/or continuous component or it may be formed of several independent components. Other configurations of the diffusing reflector 114 are also possible and are deemed to be within the scope of the present invention. The diffusive reflector 114 can be angled or shaped along its edges so as to control the direction of reflection, thereby ensuring that more of the energy beams 150 are directed across the front surface 111 of the touch panel 110.

In a preferred embodiment, a diffusing reflector 114 is constructed from a translucent or transparent bezel. The bezel 114 may be constructed from the same or a similar material as the touch panel 110. An edge of the bezel 114 is covered or coated with the above-described reflective component 113. As mentioned above, the reflective component 113 may simply be a coat of white paint. The reflective component 113 provides the desired diffusively reflective properties to the bezel 114. This preferred embodiment is therefore characterized by a simple and cost effective construction.

It should be appreciated that the ray or arrow-like representations of energy beams 140, 150 within the several figures hereof are intended to represent exemplary transmission or propagation paths of wave fronts or pulse fronts, since most types of energy are typically propagated as some form of oscillating (e.g., sinusoidal) wave or periodic pulse. Moreover, it should be understood that the illustrated representations of energy beams 140, 150 are not intended to be limiting regarding the details of the transmission, reflection, refraction, etc.

Energy beams 150 that are reflected across the front surface 111 of the touch panel 110 are detected by detectors 130, 131. These detectors 130, 131 may be configured to monitor and/or detect variations (changes, etc.) in the energy beams 150. For example, a touch 170 (e.g., by a finger, stylus, or other object) on or near the front surface 111 of the touch panel may cause a level of interruption of the reflected energy beams 150 such that the touch location 170 appears as a shadow or silhouette when detected by the detectors 130, 131. In some embodiments, filtering may be employed by the detectors 130, 131 and/or software in order to enhance the detection of energy beam intensity variations. However, the contrast of intensities between the energy beams 150 and surrounding noise may be sufficient to negate the need for filtering.

The detectors 130, 131 are positioned within or adjacent (e.g., in proximity) to the touch panel 110 such that they can monitor and or detect the energy beams 150 that are reflected across the front surface 111. Reflectors and/or prisms can be used, as or if needed, depending on the location of the detectors 130, 131, to allow the detectors 130, 131 to detect the energy beams 150. In the example shown in FIG. 1, the detectors 130, 131 are positioned within or along the bottom edge 115 of the touch panel 110, one in each corner. At least two spaced apart detectors are included in preferred embodiments, so that the location of the touch can be determined using triangulation techniques, as described below.

A detector 130, 131 can be any device that is capable of detecting (e.g., imaging, monitoring, etc.) variations in the energy beams 150 reflected across the front surface 111 of the touch panel 110. For example, a suitable detector 130, 131 may be one of various types of cameras, such as an area scan or line scan (e.g., digital) camera. Such an area scan or line scan camera may be based on complementary metal oxide semiconductor (CMOS) or charge coupled device (CCD) technologies, which are known in the art. Furthermore, monochrome (e.g., gray-scale) cameras may be sufficient because the detectors 130, 131 do not need to acquire detailed color images.

While cameras generally are more expensive than other types of detector devices that can be used in touch panel display systems 100, such as photo-detectors (e.g., photodiodes or photo-transistors), they allow greater accuracy for touch detection. As known in the art, area scan or line scan cameras (particularly those with monochrome capability) are typically less expensive than cameras configured to acquire detailed images and/or that have color detection capability. Thus, relatively cost effective area scan or line scan cameras can provide the touch panel display system 100 with very accurate touch detection capability. However, it should be understood that other devices may be used to provide the functions of the detectors 130, 131 in accordance with other embodiments of the invention.

Accordingly, the touch panel display system 100 of the present invention is configured to detect a touch 170 (e.g., by a finger, stylus, or other object) based on detected variations in energy beams that are reflected across the front surface 111 of the touch panel 110. The energy source 120 emit energy beams 140 that are directed into and internally reflected within the interior volume of the touch panel 110. Reflective component 113 may be used to minimize unintended losses while the energy beams 140 are channeled through the interior volume of the touch panel 110. Energy beams 140 that do escape toward the front surface 111 are reflected across the front surface 111 by one or more diffusing reflector 114.

The reflected energy beams 150 diffuse across the front surface 111 and are monitored by the detectors 130, 131. The detectors 130, 131 may be configured to detect variation (e.g., a decrease, absence, etc.) in the intensity of the energy beams 150. As will be appreciated by those of ordinary skill in the art, the required output capacity of the energy source 120 to allow adequate detection by the detectors may be based on various factors, such as the size of the touch panel 110, the expected losses within the touch panel display system 100 (e.g., 1/distance$^2$ losses) and due to and the surrounding medium (e.g., air), speed or exposure time characteristics of the detectors 110, ambient light characteristics, etc. As will be discussed with respect to subsequent figures, the detectors 130, 131 transmit data regarding the energy beams 150 (or variation therein) to a computing device (not depicted) that executes software for processing said data and calculating the location of the touch 170 relative to the touch panel 110.

Figure 2:
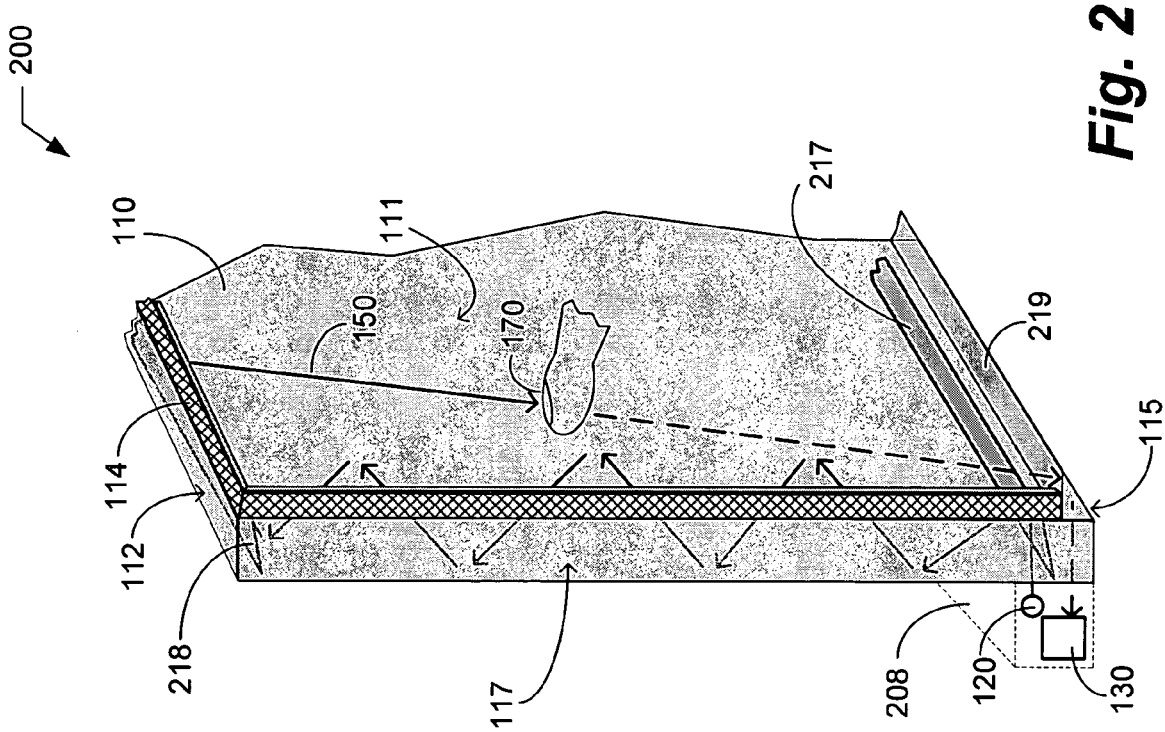
FIG. 2 is an exemplary partial perspective view of a touch panel display system in accordance with exemplary embodiments of the present invention.

FIG. 2 is an partial perspective view of an exemplary touch panel display system 200, in accordance with certain other embodiments of the present invention. As indicated by the like reference numerals in FIG. 2, the illustrate touch panel display system 200 includes many of the same or substantially similar components as the previously described touch panel display system 100 of FIG. 1. In that regard, the touch panel display system 200 includes an energy source 120 and energy detectors 130, 131 (not shown) positioned along the same edge (e.g., the bottom edge 115) of the touch panel 110. As described previously, the touch panel 110 includes a front surface 111, a rear surface 109, a top edge 112, a bottom edge 115, a right edge 116 and a left edge 117. The touch panel 110 also includes an interior volume. Optionally, one or more edge 112, 115, 116, 117 of the touch panel 110 may be covered by a reflective component 113 (not depicted) to facilitate the internal reflection of energy beams 140 within the interior volume of the touch panel 110. The touch panel 110 includes one or more diffusing reflector 114 for reflecting energy beams 150 across the front surface 111 of the touch panel 110.

As a variation of the previously described touch panel display system 100 of FIG. 1, the energy source 120 and the detectors 130, 131 included in the touch panel display system 200 of FIG. 2 are positioned adjacent to and rearward of the rear surface 109 of the touch panel 110. For example, the energy source 120 and the detectors 130, 131 may be mounted on or within a rear support member 208. The rear support member 208 may be formed as an integral part of the touch panel 110, or may be constructed separately from the touch panel 110 and attached or mounted thereto. For example, the support member 208 may be a circuit board or other mounting surface that can support the energy source 120 and the detectors 130, 131 in appropriate positions for the operation of the touch panel display system 200. The positioning of the energy source 120 and the detectors 130, 131 on or within the support member 208 can, for example, provide additional protection to these components and may also facilitate a compact and efficient profile for the touch panel display system 200.

The exemplary touch panel display system 200 of FIG. 2 includes one or more reflectors 217, 218, 219, positioned within or adjacent to the touch panel 110. For example, the touch panel display system 200 includes a first reflector 217 positioned within or adjacent to the bottom edge 115 of the touch panel 110 for guiding energy beams 140 from the energy source 120 into the touch panel 110. The first reflector 217 can be shaped and/or positioned such that it causes at least a portion of the energy beams 140 to be internally reflected within the interior volume of the touch panel 110. Similarly, a second reflector 218 is positioned within or adjacent to the top edge 112 of the touch panel 110. The second reflector 218 can be shaped and/or positioned such that causes at least a portion of the energy beams 140 to be directed out of the interior volume of the touch panel 110 toward the front surface 111 and the diffusing reflector(s) 114.

A third reflector 219 and corresponding fourth reflector (not shown) can also be positioned within or adjacent to the bottom edge 115 of the touch panel 110. The third reflector 219 and fourth reflector can be shaped and/or positioned so as to guide energy beams 150 from the front surface 111 of the touch panel 110 toward the detectors 130, 131. In certain embodiments, the third reflector 219 and fourth reflector are positioned along or within the bottom edge 115 of the touch panel, one at each corner. Other configurations and locations for the third reflector 119 and the fourth reflector are possible. In addition, the function of the third reflector 219 and fourth reflector may be performed using only the third reflector 119, or using multiple reflectors.

The above described reflectors 217, 218, 219 can be constructed from any material and in any configuration capable of reflecting energy beams 140, 151. For example, if the energy source 120 emits visible or non-visible light energy, one or more of the reflectors 217, 218, 219 may be constructed of a metallic material in a specular configuration. As another example, one or more of the reflectors 217, 218, 219 may be constructed of an acrylic and/or glass type of material (e.g., the same material as the touch panel 110), in a prismatic or partially prismatic configuration, to reflect visible or non-visible light energy. The reflectors 217, 218, 219 may also be constructed of other materials and in other configurations (such as a mirror prism, an acoustic reflector, or a microwave reflector) in accordance with the type of energy that they are used to reflect.

The use of one or more of the reflectors 217, 218, 219 may be optional in certain embodiments. For example, the touch panel display system 200 might only include reflectors 217, 219 along the bottom edge 115 of the touch panel 110 for guiding energy beams 140, 150 from the energy source and to the detector 130. The direction of energy beams 140 outward from the interior volume of the touch panel 110 to the front surface 111 may be facilitated by a reflective component 113 as discussed above and/or by the geometry of the edges 112, 115, 116, 117, front surface 111 and/or rear surface 109 of the touch panel 110. A more detailed discussion of the exemplary operation of the touch panel display system 200 with respect to the reflectors 217, 218, 219 will be presented below.

Figure 3B:
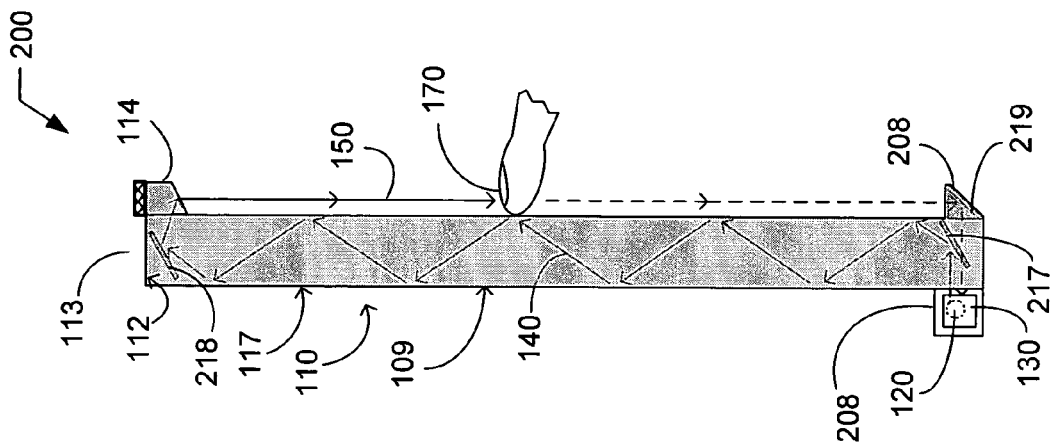
FIG. 3B is a cross-sectional side view of the exemplary touch panel display system illustrated in FIG. 2.
Figure 3A:
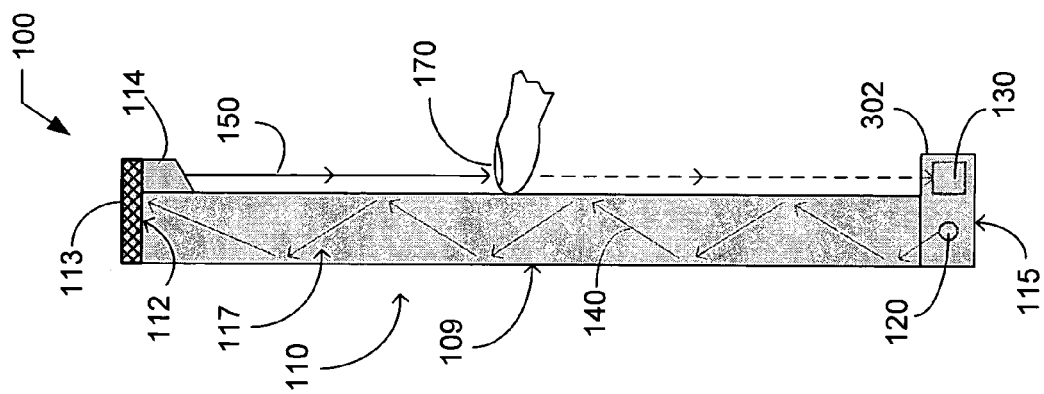
FIG. 3A is a cross-sectional side view of the exemplary touch panel display system illustrated in FIG. 1.

FIG. 3A is a cross-sectional side view of the exemplary touch panel display system 100 illustrated in FIG. 1. As shown, the energy source 120 and the detectors 130, 131 (not shown) may all be positioned along or within the bottom edge 115 of the touch panel 110. In the illustrated embodiment, the energy source 120 is positioned behind the detectors 130, 131, relative to the depth of the touch panel 110. The energy source 120 is shown as being positioned within the bottom edge 115 of the touch panel 110, and configured for emitting and reflecting energy beams 140 into the interior volume of the touch panel 110. The detectors 130, 131 are shown as being positioned forward of the front surface 111 of the touch panel 110, and configured for line-of-sight exposure to the energy beams 150 reflected across the front surface 150. For example, the detectors 130, 131 may be mounted on or within a front support member 302, which may be attached to or formed as an integral part of the touch panel 110.

As discussed above, the interior volume of the touch panel 110 can act as a guide (e.g., a wave guide or pulse guide) for the energy beams 140 emitted from the energy source 120. At least a portion of the energy beams 140 that propagate through the interior volume of the touch panel 110 escape and/or are directed out of the interior volume toward the front surface 111 of the touch panel 110. The energy beams 140 may enter/exit the interior volume of the touch panel 110 based on the optical principles of coupling, reflection, refraction, etc. As previously mentioned, a reflective component 113 (shown only one top edge 112) may be added to one or more edge 112, 115, 116, 117 of the touch panel 110 in order to facilitate the desired propagation of the energy beams 140. The reflective component 113 may also be applied to an edge of a bezel 114 that extends forward from the front surface 111 of the touch panel in order to provide diffusive reflective properties.

Due to the chosen positioning of the energy source 120 in the illustrated embodiment, additional reflectors (e.g., reflector 217 FIG. 2) are not required for guiding the energy beams 140 from the energy source 120 into the interior volume of the touch panel 110. Likewise, the combination of the reflective component 113 on at least the top edge 112 and the diffusive reflector 114 (e.g., a transparent or translucent bezel covered or coated with the reflective component 113) eliminates the need for additional reflectors (e.g., reflector 218 FIG. 2) for guiding energy beams 140 outward from the interior volume toward the front surface 111. Energy beams that escape the interior volume of the touch panel 110 toward the front surface 111 are diffusively reflected across the front surface by the one or more diffusing reflectors 114. A touch 170 on or near the front surface 111 of the touch panel 110 will result in a variation of the intensity of such energy beams 150. The variation in intensity will be detected by the detectors 130, 131. Due to the chosen positioning of the detectors 130, 131 in the illustrated embodiment, additional reflectors (e.g., reflector 219 of FIG. 2) are not required for guiding energy beams 150 reflected across the front surface 111 of the touch panel 110 toward the detectors 130, 131.

FIG. 3B is cross-sectional side view of the exemplary touch panel display system 200 illustrated in FIG. 2. The energy source 120 and the detectors 130, 131 (not shown) are again all positioned along the bottom edge 115 of the touch panel 110. In this illustrates embodiment, the energy source 120 and the detectors 130, 131 are positioned rearward of the rear surface 109 of the touch panel 110. For example, the energy source 120 and the detectors 130, 131 may be mounted on or within a rear support member 208, which may be attached to or formed as an integral part of the touch panel 110.

A first reflector 217 is used to guide energy beams 140 emitted by the energy source 120 into the interior volume of the touch panel 110. Similarly, a second reflector 218 may be used to guide energy beams 140 from the interior volume of the touch panel 110 outward toward the front surface 111. A third reflector 219 and a corresponding fourth reflector (not shown) guide energy beams reflected across the front surface 111 of the touch panel 110 toward the detectors 130, 131. The third reflector 219 and fourth reflector may, for example, be mounted on or within a front support member 208. Accordingly, the use of one or more reflectors 217, 218, 219 provides flexibility in the choice of position for both the energy source 120 and the detectors 130, 131. Although the energy source 120 and detectors 130, 131 are shown in this illustrated embodiment as being positioned rearward of the rear surface 109, they could alternatively be similarly positioned forward of the front surface 111.

Figure 4:
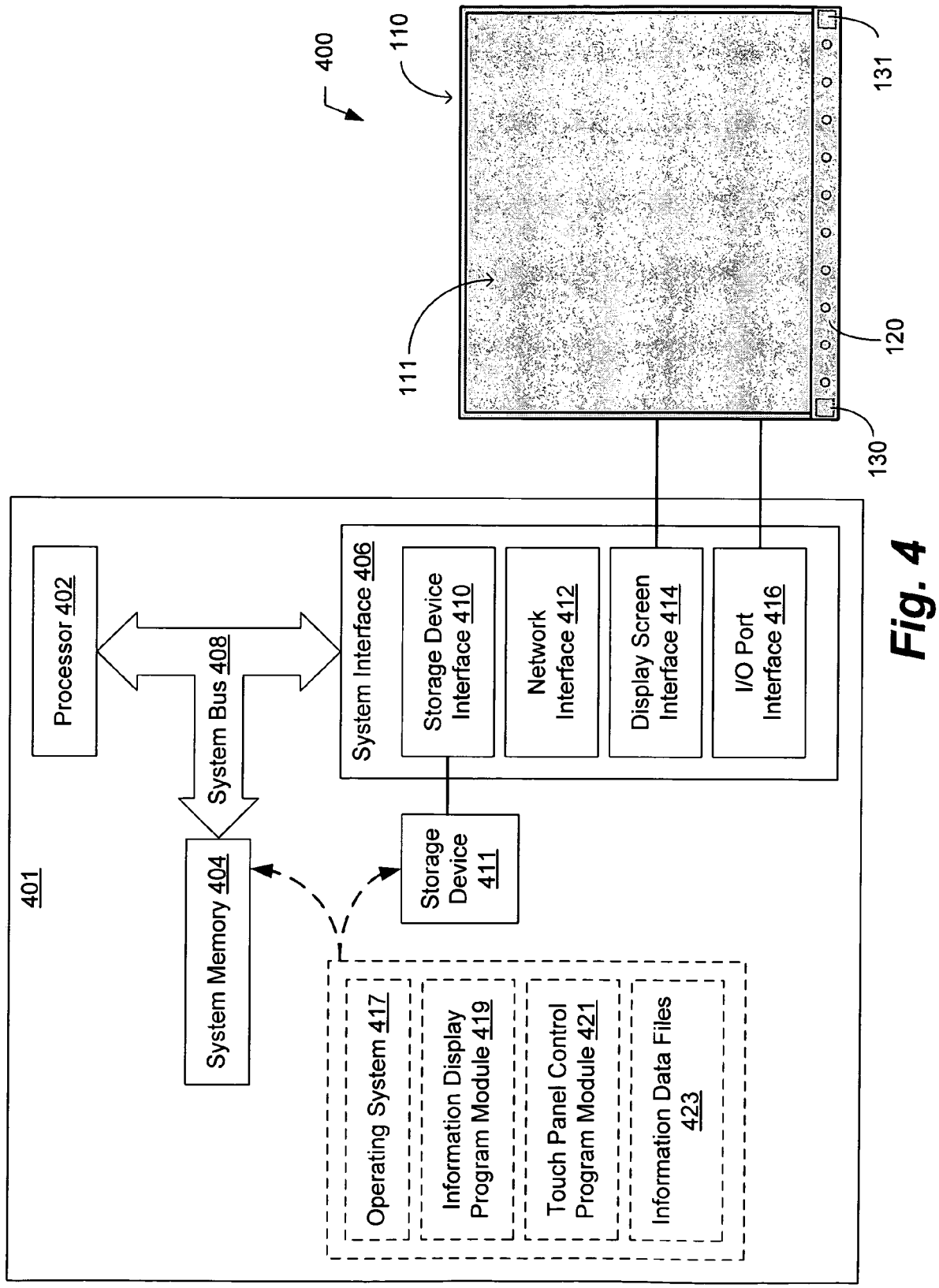
FIG. 4 is a block diagram illustrating an exemplary touch panel display system interfaced with an exemplary computing device in accordance with exemplary embodiments of the present invention.

FIG. 4 is a block diagram illustrating an exemplary touch panel display system 400 (e.g., the touch panel display system 100 of FIG. 1 or the touch panel display system 200 of FIG. 2) interfaced to an exemplary computing device 401 in accordance with certain exemplary embodiments of the present invention. The computing device 401 may be functionally coupled to a touch panel display system 400, either by a hardwire or wireless connection. The exemplary computing device 401 may be any type of processor-driven device 401, such as a personal computer, a laptop computer, a handheld computer, a personal digital assistant (PDA), a digital and/or cellular telephone, a pager, a video game device, etc. These and other types of processor-driven devices will be apparent to those of skill in the art. As used in this discussion, the term "processor" can refer to any type of programmable logic device, including a microprocessor or any other type of similar device.

The computing device 401 may include, for example, a processor 402, a system memory 404, and various system interface components 406. The processor 402, system memory 404, and system interface components 406 may be functionally connected via a system bus 408. The system interface components 406 may enable the processor 402 to communicate with peripheral devices. For example, a storage device interface 410 can provide an interface between the processor 402 and a storage device 411 (e.g., removable and/or non-removable), such as a disk drive. A network interface 412 may also be provided as an interface between the processor 402 and a network communications device (not shown), so that the computing device 401 can be connected to a network.

A display screen interface 414 can provide an interface between the processor 402 and a display device 190 (see FIG. 1.) The touch panel 110 of the touch panel display system 400 may be display device 190 may be positioned in front of or otherwise attached or mounted to the display device 190. Alternately, the touch panel display system 400 may be an integral part of a display device 190, wherein the touch panel 110 also functions as the display screen 192 of the display device 190. One or more input/output ("I/O") port interfaces 416 may be provided as an interface between the processor 402 and various input and/or output devices. For example, the detectors 130, 131 or other suitable components of the touch panel display system 400 may be connected to the computing device 401 via an input port and may provide input signals to the processor 402 via an input port interface 416. Similarly, the energy source 120 of the touch panel display system 400 may be connected to the computing device 401 by way of an output port and may receive output signals from the processor 402 via an output port interface 416.

A number of program modules may be stored in the system memory 404 and/or any other computer-readable media associated with the storage device 411 (e.g., a hard disk drive). The program modules may include an operating system 417. The program modules may also include an information display program module 419 comprising computer-executable instructions for displaying images (e.g., 196, 197, 198 of FIG. 1) or other information on a display screen 192. Other aspects of the exemplary embodiments of the invention may be embodied in a touch panel control program module 421 for controlling the energy source 120 and/or detectors 130, 131 of the touch panel display system 400 and/or for calculating touch locations relative to the touch panel 110 based on signals received from the detectors 130, 131. The processor 402, which may be controlled by the operating system 417, can be configured to execute the computer-executable instructions of the various program modules. Furthermore, the images or other information displayed by the information display program module 419 may be stored in one or more information data files 423, which may be stored on any computer readable medium associated with the computing device 401.

As discussed above, when a user touches on or near the touch panel 110, a variation will occur in the intensity of the energy beams 150 reflected across the front surface 111 of the touch panel 110. The detectors 130, 131 are configured to detect the intensity of the energy beams 150 reflected across the front surface 111 of the touch panel 110 and should be sensitive enough to detect variations in such intensity. Information signals produced by the detectors 130, 131 and/or other components of the touch panel display system 400 may be used by the computing device 401 to determine the location of the touch 170 relative to the touch panel 110 (and therefore relative to the display screen 192). The computing device 401 may also determine the appropriate response to a touch 170 on or near the touch panel 110

In accordance with some embodiments of the invention, data from the touch panel display system 100 may be periodically processed by the computing device 401 to monitor the typical intensity level of the energy beams 150 reflected across the front surface 111 of the touch panel 110 when no touch 170 is present. This allows the system to account for, and thereby reduce the effects of, changes in ambient light levels and other ambient conditions. The computing device 401 may optionally increase or decrease the intensity of the energy beams 140 emitted by the energy source 120, as needed. Subsequently, if a variation in the intensity of the reflected energy beams 150 is detected by the detectors 130, 131, the computing device 401 can process this information to determine that a touch 170 has occurred on or near the touch panel 110.

The location of a touch relative to the touch panel 110 may be determined, for example, by processing information received from each detector 130, 131 and performing one or more triangulation calculations. By way of illustration, the computing device 401 may receive information from each detector 130, 131 that can be used to identify the position of an area of decreased energy beam intensity relative to each detector 130, 131. The location of the area of decreased energy beam intensity relative to each detector may be determined in relation to one or more pixels, or virtual pixels, of the touch panel 110. The location of the area of decreased energy beam intensity relative to each detector may then be triangulated, based on the geometry between the detectors 130, 131, to determine the actual location of the touch relative to the touch panel 110. Calculations to determine a touch location 170 can include algorithms to compensation for discrepancies (e.g., lens distortions, ambient conditions, damage to or impediments on the touch panel 110, etc.), as applicable.

It should be appreciated by those skilled in the art that the foregoing descriptions of the information display program module 419 and the touch panel control program module 421 are exemplary. Certain functionality of the exemplary embodiments of the invention may be provided by way of any type and number of program modules, created in any programming language, which may or may not be stored locally at the computing device 401. For example, the computing device 401 may comprise a network server, client, or appliance that may be configured to execute program modules (e.g., 419 and 421) that are stored on another network device and/or for controlling a remotely located touch panel display system 400. Accordingly, exemplary embodiments of the touch panel display system 400 may provide an intuitive control interface for any computing device 401 that is capable of determining the position of a touch 170 on or near a touch panel screen 1 10 based on data from, for example, the detectors 130, 131.

Based on the foregoing, it can be seen that the present invention provides an improved touch panel display system.

Many other modifications, features and embodiments of the present invention will become evident to those of skill in the art. It should be appreciated, therefore, that many aspects of the present invention were described above by way of example only and are not intended as required or essential elements of the invention unless explicitly stated otherwise. Accordingly, it should be understood that the foregoing relates only to certain embodiments of the invention and that numerous changes may be made therein without departing from the spirit and scope of the invention as defined by the following claims. It should also be understood that the invention is not restricted to the illustrated embodiments and that various modifications can be made within the scope of the following claims.

What is claimed is:

1. A touch panel display system, comprising:
    a touch panel having a front surface, a rear surface, an interior volume, and a first edge and a second edge disposed on opposite sides of the touch panel;
    an energy source positioned along the first edge of the touch panel and configured to emit energy that is propagated within the interior volume of the touch panel;
    a diffusing reflector positioned along the second edge of the touch panel, in proximity to the front surface, the diffusing reflector having a reflective quality that causes at least a portion of the energy escaping from the interior volume of the touch panel in a direction to reflect across the front surface of the touch panel in various other directions; and
    at least one detector positioned along the first edge of the touch panel and configured to detect intensity levels of at least a portion of the energy that is diffusively reflected across the front surface of the touch panel.

2. The touch panel display system of claim 1, wherein the touch panel is positioned in front of a display screen so that objects on the display screen can be seen through the touch panel.

3. The touch panel display system of claim 1, wherein the energy is selected from the group consisting of: non-visible light energy, visible light energy, microwave energy, and acoustic energy.

4. The touch panel display system of claim 1, wherein the energy source comprises a plurality of energy emitters positioned at spaced intervals along the first edge of the touch panel.

5. The touch panel display system of claim 4, wherein the energy emitters are embedded at least partially within the first edge of the touch panel.

6. The touch panel display system of claim 1, wherein the diffusing reflector comprises a reflective component applied to an edge of a translucent or transparent bezel.

7. The touch panel display system of claim 6, wherein the reflective component comprises white paint.

8. The touch panel display system of claim 1, further comprising a reflector positioned and configured to guide the energy emitted by the energy source into the interior volume of the touch panel.

9. The touch panel display system of claim 1, further comprising a reflector configured and positioned to guide the energy outward from within the interior volume of the touch panel toward the front surface of the touch panel.

10. The touch panel, display system of claim 1, further comprising a reflector positioned and configured to guide the energy reflected across the front surface of the touch panel toward the detector.

11. The touch panel display system of claim 9, wherein the first detector and the second detector are optical imaging devices of sufficient sensitivity to detect variations in the intensity levels of the energy that is diffusively reflected across the front surface of the touch panel.

12. The touch panel display system of claim 1, further comprising a reflective component applied to at least one edge of the touch panel for controlling the direction of the energy propagated within the interior volume of the touch panel.

13. The touch panel display system of claim 1, wherein the at least one detector comprises a first detector and a second detector spaced apart from each other along the first edge of the touch panel.

14. The touch panel display system of claim 1, wherein a touch on or near the front surface of the touch panel results in a variation in the intensity levels of the energy that is diffusively reflected across the front surface.

15. The touch panel display system of claim 1, wherein the touch panel comprises a transparent material selected from the group consisting of: glass, plastic and thermoplastic.

16. The touch panel display system of claim 1, wherein the energy source is positioned along the first edge of the touch panel and configured to emit energy that is propagated within the interior volume of the touch panel and not across the front surface of the touch panel.

17. The touch panel display system of claim 1, wherein the at least one detector is positioned along the first edge of the touch panel and configured to detect intensity levels of the energy that is diffusively reflected across the front surface of the touch panel and not the energy that is propagated within the interior volume of the touch panel.

18. A touch panel display system, comprising:
    a touch panel having at least a front surface, a rear surface, an interior volume, and a first edge and a second edge disposed on opposite sides of the touch panel;
    an energy source positioned along the first edge of the touch panel and configured to emit energy that is propagated within the interior volume of the touch panel;
    a diffusing reflector positioned along the second edge of the touch panel, the diffusing reflector having a reflective quality that causes at least a portion of the energy escaping from the interior volume of the touch panel in a direction to reflect across the front surface of the touch panel in various other directions;
    a first detector positioned along the first edge of the touch panel and configured to detect at least a portion of the energy diffusively reflected across the front surface of the touch panel; and
    a second detector positioned along the first edge of the touch pad, spaced apart from the first detector, and configured to detect at least a portion of the energy diffusively reflected across the front surface of the touch panel.

19. The touch panel display system of claim 18, wherein the touch panel is positioned in front of a display screen so that objects on the display screen can be seen through the touch panel.

20. The touch panel display system of claim 18, wherein the energy is selected from the group consisting of: non-visible light energy, visible light energy, microwave energy, and acoustic energy.

21. The touch panel display system of claim 18, wherein the energy source comprises a plurality of energy emitters positioned at spaced intervals along the first edge of the touch panel.

22. The touch panel display system of claim 21, wherein the energy emitters comprise infrared light emitting diodes.

23. The touch panel display system of claim 18, further comprising a reflector positioned and configured to guide the energy emitted by the energy source into the interior volume of the touch panel.

24. The touch panel display system of claim 18, further comprising a reflector configured and positioned to guide the energy outward from within the interior volume of the touch panel toward the front surface of the touch panel.

25. The touch panel display system of claim 18, further comprising a first reflector positioned and configured to guide the energy reflected across the front surface of the touch panel toward the first detector; and
    a second reflector positioned and configured to guide the energy reflected across the front surface of the touch panel toward the second detector.

26. The touch panel display system of claim 18, wherein the first detector and the second detector are optical imaging devices of sufficient sensitivity to detect variations in the intensity levels of the energy that is diffusively reflected across the front surface of the touch panel.

27. The touch panel display system of claim 18, further comprising a reflective component applied to at least one edge of the touch panel for controlling the direction of the energy propagated within the interior volume of the touch panel.

28. The touch panel display system of claim 18, wherein the first detector and the second detector are positioned along the first edge of the touch panel and configured to detect the energy that is diffusively reflected across the front surface of the touch panel and not the energy that is propagated within the interior volume of the touch panel.

29. The touch panel display system of claim 18, wherein the touch panel comprises a transparent material selected from the group consisting of: glass, plastic and thermoplastic.

30. The touch panel display system of claim 18, wherein a touch on or near the front surface of the touch panel results in a variation in the intensity levels of the energy that is diffusively reflected across the front surface.

31. The touch panel display system of claim 18, wherein the diffusing reflector comprises a reflective component applied to an edge of a translucent or transparent bezel.

32. The touch panel display system of claim 31, wherein the reflective component comprises white paint.

33. The touch panel display system of claim 18, wherein the energy source is positioned along the first edge of the touch panel and configured to emit energy that is propagated within the interior volume of the touch panel and not across the front surface of the touch panel.

34. A touch panel display system, comprising:
    a touch panel having a front surface, a rear surface, an interior volume, and a first edge and a second edge disposed on opposite sides of the touch panel;
    an energy source positioned along the first edge of the touch panel and configured to emit energy that is propagated within the interior volume of the touch panel;
    a diffusing reflector positioned along the second edge of the touch panel, in proximity to the front surface, and configured to diffusively reflect across the front surface at least a portion of the energy that escapes from the interior volume of the touch panel; and
    at least one detector positioned along the first edge of the touch panel and configured to detect intensity levels of the energy that is diffusively reflected across the front surface of the touch panel;
    wherein the at least one detector comprises a first detector and a second detector spaced apart from each other along the first edge of the touch panel; and
    wherein the first detector and the second detector are optical imaging devices of sufficient sensitivity to detect variations in the intensity levels of the energy that is diffusively reflected across the front surface of the touch panel.

35. A touch panel display system, comprising:
    a touch panel having a front surface, a rear surface, an interior volume, and a first edge and a second edge disposed on opposite sides of the touch panel;
    an energy source positioned along the first edge of the touch panel and configured to emit energy that is propagated within the interior volume of the touch panel;
    a diffusing reflector positioned along the second edge of the touch panel, in proximity to the front surface, and configured to diffusively reflect across the front surface at least a portion of the energy that escapes from the interior volume of the touch panel; and
    at least one detector positioned along the first edge of the touch panel and configured to detect intensity levels of the energy that is diffusively reflected across the front surface of the touch panel;
    wherein a touch on or near the front surface of the touch panel results in a variation in the intensity levels of the energy that is diffusively reflected across the front surface.

36. A touch panel display system, comprising:
    a touch panel having at least a front surface, a rear surface, an interior volume, and a first edge and a second edge disposed on opposite sides of the touch panel;
    an energy source positioned along the first edge of the touch panel and configured to emit energy that is propagated within the interior volume of the touch panel;
    a diffusing reflector positioned along the second edge of the touch panel, and configured to diffusively reflect across the front surface at least a portion of the energy that escapes from within the interior volume;
    a first detector positioned along the first edge of the touch panel and configured to detect the energy diffusively reflected across the front surface of the touch panel; and
    a second detector positioned along the first edge of the touch pad, spaced apart from the first detector, and configured to detect the energy diffusively reflected across the front surface of the touch panel;
    wherein a touch on or near the front surface of the touch panel results in a variation in the intensity levels of the energy that is diffusively reflected across the front surface.

37. A touch panel display system, comprising:
    a touch panel having a front surface, a rear surface, an interior volume, and a first edge and a second edge disposed on opposite sides of the touch panel;
    an energy source positioned along the first edge of the touch panel and configured to emit energy that is propagated within the interior volume of the touch panel;
    a reflector positioned along the second edge of the touch panel, in proximity to the front surface, and configured to reflect across the front surface at least a portion of the energy that escapes from the interior volume of the touch panel; and
    at least one detector positioned along the first edge of the touch panel and configured to detect intensity levels of the energy that is reflected across the front surface of the touch panel;
    wherein the at least one detector comprises a first detector and a second detector spaced apart from each other along the first edge of the touch panel, the first detector and the second detector comprising optical imaging devices of sufficient sensitivity to detect variations in the intensity levels of the energy that is reflected across the front surface of the touch panel.

38. A touch panel display system, comprising:

a touch panel having a front surface, a rear surface, an interior volume, and a first edge and a second edge disposed on opposite sides of the touch panel;

an energy source positioned along the first edge of the touch panel and configured to emit energy that is propagated within the interior volume of the touch panel;

a reflector positioned along the second edge of the touch panel, in proximity to the front surface, and configured to reflect across the front surface at least a portion of the energy that escapes from the interior volume of the touch panel; and at least one detector positioned along the first edge of the touch panel and configured to detect intensity levels of the energy that is reflected across the front surface of the touch panel;

wherein a touch on or near the front surface of the touch panel results in a variation in the intensity levels of the energy that is reflected across the front surface.

39. A touch panel display system, comprising:

a touch panel having at least a front surface, a rear surface, an interior volume, and a first edge and a second edge disposed on opposite sides of the touch panel;

an energy source positioned along the first edge of the touch panel and configured to emit energy that is propagated within the interior volume of the touch panel;

a reflector positioned along the second edge of the touch panel, and configured to reflect across the front surface at least a portion of the energy that escapes from within the interior volume;

a first detector positioned along the first edge of the touch panel and configured to detect the energy reflected across the front surface of the touch panel; and a second detector positioned along the first edge of the touch pad, spaced apart from the first detector, and configured to detect the energy reflected across the front surface of the touch panel;

wherein a touch on or near the front surface of the touch panel results in a variation in the intensity levels of the energy that is reflected across the front surface.

* * * * *

UNITED STATES PATENT AND TRADEMARK OFFICE
CERTIFICATE OF CORRECTION

PATENT NO. : 7,538,759 B2  
APPLICATION NO. : 10/840888  
DATED : May 26, 2009  
INVENTOR(S) : John Newton Page 1 of 1

It is certified that error appears in the above-identified patent and that said Letters Patent is hereby corrected as shown below:

On the Title Pg Under Item (73) Assignee:

In line 1, please change "(NL)," to --(NZ)--;

Claim 18, column 14, line 49:  
    Delete "pad" and insert --panel-- in place thereof;

Claim 36, column 16, line 41:  
    Delete "pad" and insert --panel-- in place thereof;

Claim 39, column 18, line 16:  
    Delete "pad" and insert --panel-- in place thereof;

Signed and Sealed this

Twenty-fifth Day of August, 2009

David J. Kappos  
*Director of the United States Patent and Trademark Office*